Figure 1:
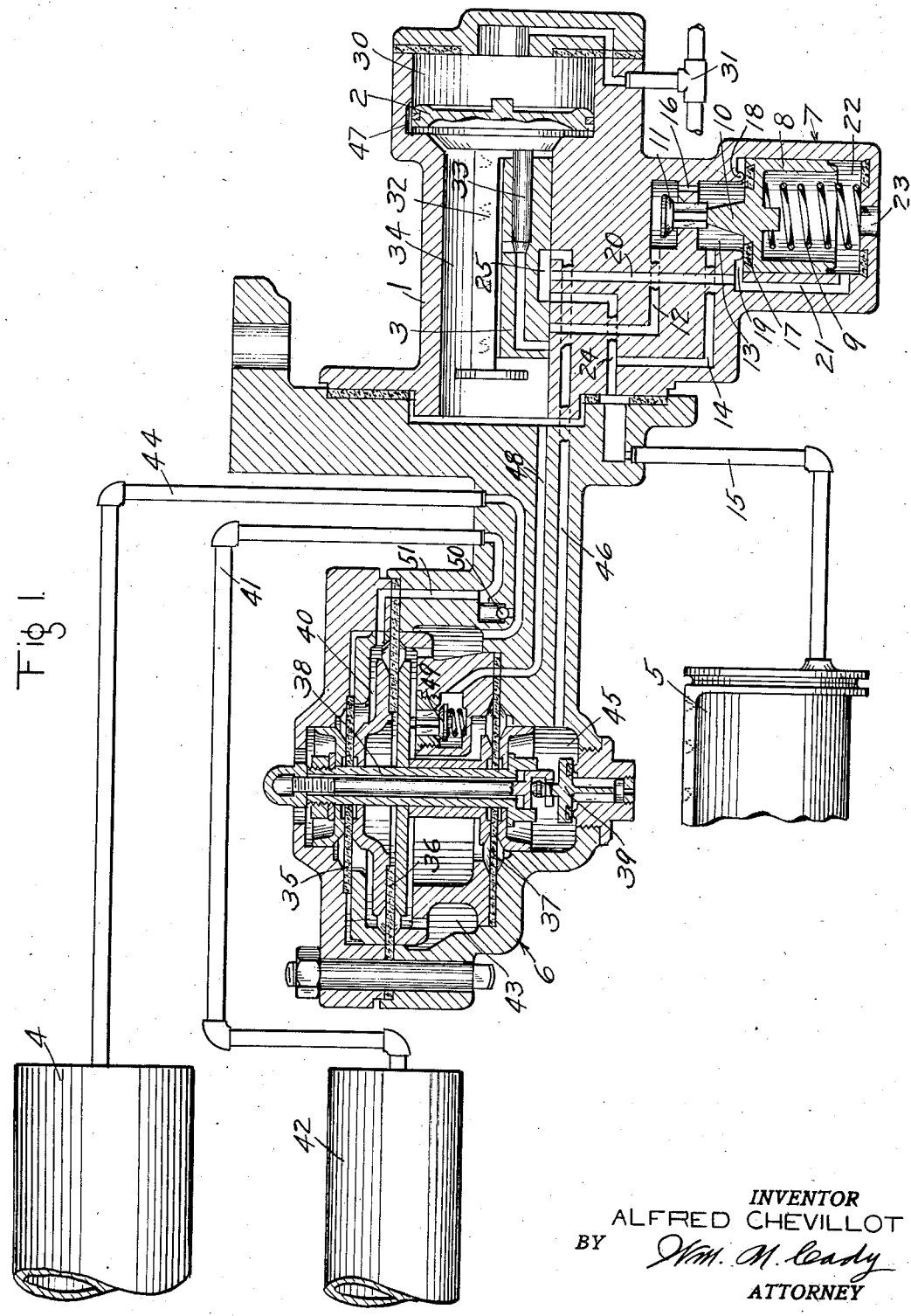

May 5, 1936.　　　A. CHEVILLOT　　　2,039,703
FLUID PRESSURE BRAKING APPARATUS
Filed Aug. 20, 1932　　　2 Sheets-Sheet 1

INVENTOR
ALFRED CHEVILLOT
BY *Wm. M. Cady*
ATTORNEY

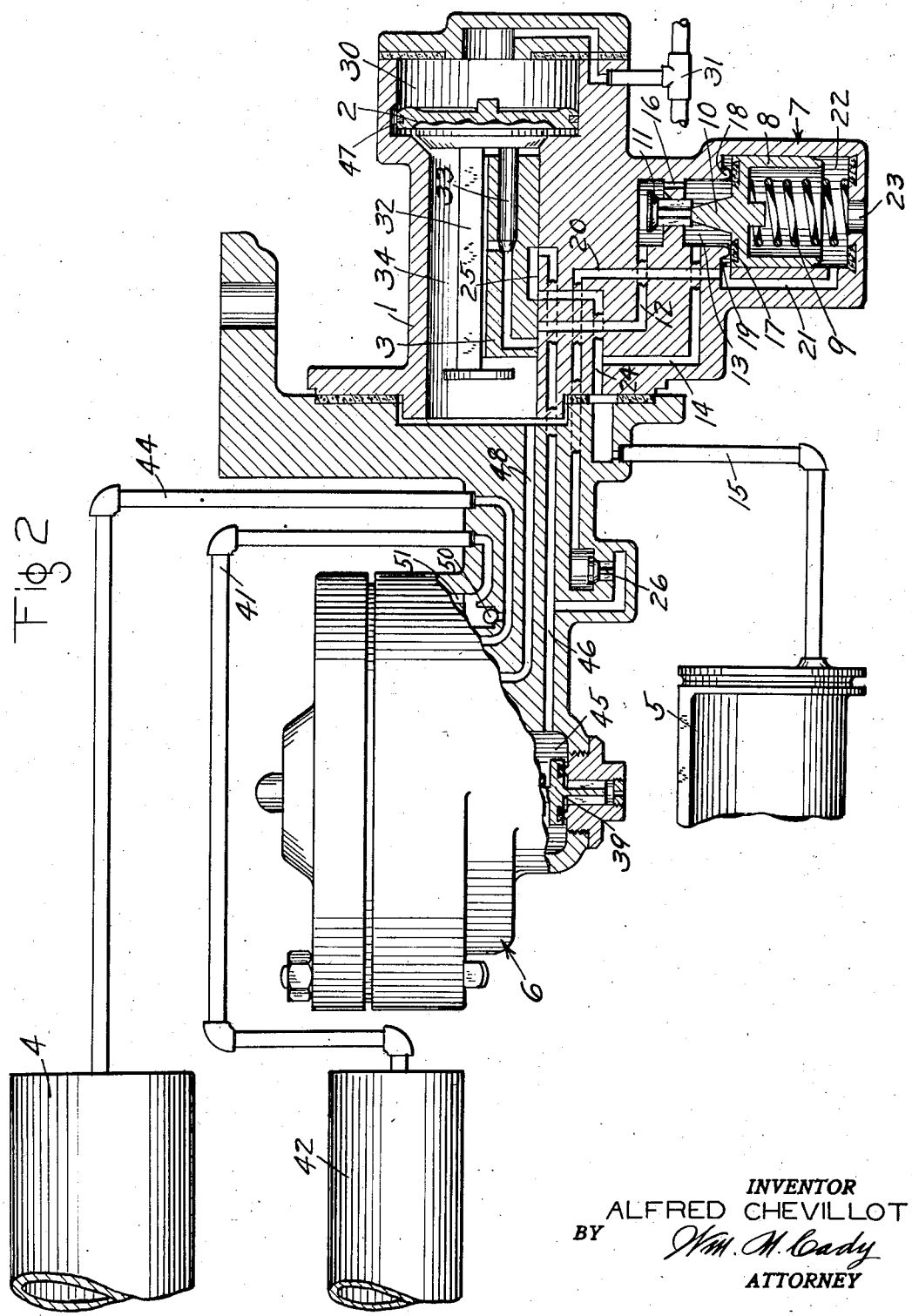

UNITED STATES PATENT OFFICE 2,039,703

FLUID PRESSURE BRAKING APPARATUS

Alfred Chevillot, Gargan Livry, France, assignor to The Westinghouse Air Brake Company, Wilmerding, Pa., a corporation of Pennsylvania Application August 20, 1932, Serial No. 629,595
In France January 19, 1932

2 Claims. (Cl. 303—74)

This invention relates to fluid pressure braking apparatus of the kind comprising a triple or distributing valve adapted to control the supply of fluid under pressure to and its release from the brake cylinder of the apparatus in accordance with variations in train pipe pressure.

The invention further relates to apparatus of the character above indicated in which the triple or distributing valve is provided with a regulating valve adapted to control the rate of flow of fluid to the brake cylinder of the apparatus in such a manner as to reduce this rate of flow as soon as a predetermined brake cylinder pressure has been established.

The invention has for its object to provide a triple or distributing valve device of this type in which the final venting of the brake cylinder to the atmosphere during the release of the brakes is properly and reliably effected as soon as the brake cylinder pressure has been reduced during the release to a predetermined relatively low value.

According to the present invention this final release of fluid under pressure from the brake cylinder is arranged to be effected through the regulating valve by the return of the latter to its normal position.

The invention is illustrated by way of example in the accompanying drawings of which Figure 1 is a diagrammatic view of fluid pressure braking apparatus embodying one form of the invention; Figure 2 being a similar view illustrating a modification thereof.

Referring now to the construction shown in Figure 1, it will be seen that the apparatus comprises a triple valve device 1 comprising the usual piston 2 contained in piston chamber 30 which is connected to the brake pipe 31 and having a piston stem 32 for operating slide valve 3 and graduating valve 33, contained in valve chamber 34. The valves 3 and 33 are operated by piston 2 upon a reduction in brake pipe pressure to supply fluid under pressure from the auxiliary reservoir 4 to the brake cylinder 5.

The graduated release of fluid from the brake cylinder is controlled by a graduated release valve device 6 comprising flexible diaphragms 35, 36, and 37 operatively connected to a stem 38 for operating a release valve 39.

The chamber 40 intermediate the diaphragms 35 and 36 is connected through pipe 41 with a control reservoir 42. The chamber 43 intermediate the diaphragms 36 and 37 is connected through pipe 44 with the auxiliary reservoir 4, and the chamber 45, below the diaphragm 37 is connected to the exhaust passage 46 of the triple valve device.

The triple valve device 1 is provided with a regulating valve 7 of the well known construction comprising a piston or plunger 8 normally adapted to be maintained in the position shown in the drawings by means of a controlling spring 9. The piston 8 is provided with a stem 10 adapted to actuate a valve 11 controlling communication between the service port and passage 12 of the triple valve device 1 and the space 13 above the piston 8 which communicates by means of a passage 14 and a pipe 15, with the brake cylinder 5. Communication between the service port and passage 12 and the space 13 is also provided by a restricted passage 16.

The upper face of the piston 8 is provided with a gasket 17 adapted to engage with an annular rib 18 when the piston 8 is in its upper position as shown. The annular space 19 surrounding the rib 18 is in open communication with a passage 20 leading to the seat of the slide valve 3 and a passage 21 is provided leading from the annular space 19 to the chamber 22 underneath the piston 8, which chamber is in communication with the atmosphere through a port 23.

In operation, when the brake pipe 31 is charged with fluid under pressure, fluid flows from piston chamber 30, through the usual feed groove 47 to valve chamber 34 of the triple valve device and thence through passage 48. The graduated release valve device 6 being positioned as shown in the drawings, valve 49 is held unseated, so that fluid flows from passage 48 to chamber 43 and thence through pipe 44 to the auxiliary reservoir 4, thus charging the auxiliary reservoir with fluid at the pressure carried in the brake pipe 31.

The control reservoir 42 is also charged with fluid under pressure supplied to chamber 43, past the check valve 50, and chamber 40, being connected to the control reservoir 42, through passage 51, is also charged with fluid under pressure.

The diaphragm 36 is thus subjected to the opposing pressures of the control reservoir 42, and the auxiliary reservoir 4, while the diaphragm 37 is subjected to the opposing pressures of the auxiliary reservoir and the brake cylinder.

When a reduction in brake pipe pressure is effected in the ordinary manner to cause an application of the brakes, the piston 2 of the triple valve device 1 and its slide valve 3 are moved towards the right, thereby effecting the flow of fluid under pressure from the auxiliary reservoir 4 to the brake cylinder 5 by way of the service port and passage 12 and past the open valve 11 and aperture 16 to the passage 14 and pipe 15 leading to the brake cylinder 5.

As soon as a predetermined pressure is established in the brake cylinder, the brake cylinder pressure obtaining in the space 13 acting upon the upper face of the piston 8 moves the latter to its lower position against the action of the controlling spring 9, thereby permitting the valve 11 to close and cutting off communication between the passage 21 and the atmospheric port 23.

The closure of the valve 11 causes a further supply of fluid under pressure to the brake cylinder 5 to be effected through the restricted port 16 only so that the application of the brakes is effected in the well known two-stage manner.

When the brake pipe pressure is restored towards its normal value in order to effect the release of the brakes the piston 2 and slide valve 3 of the triple valve device 1 return to the position shown and the graduated release of fluid from the brake cylinder is effected through the graduated release valve device 6.

When the triple valve device 1 moves to release position, after an application of the brakes, fluid at brake cylinder pressure is supplied through passage 46 to chamber 45 of the graduated release valve device 6. The increase in pressure in chamber 45, together with the increase in pressure in the chamber 43, due to the recharging of the auxiliary reservoir, causes the diaphragms 36 and 37 to be moved upwardly, so that the valve 39 is lifted from its seat, permitting the release of fluid from the chamber 45 and the brake cylinder. Dependent upon the extent to which the brake pipe pressure and consequently the auxiliary reservoir pressure is increased, and as soon as the brake cylinder pressure has been reduced so that the control reservoir pressure in chamber 40 overcomes the increased auxiliary reservoir pressure in chamber 43 and the reduced brake cylinder pressure in chamber 45, the diaphragms are operated to seat the release valve 39.

A further increase in brake pipe pressure causes the auxiliary reservoir pressure in chamber 43 to be increased so that the diaphragms are again operated to unseat the valve 39 and permit the further release of fluid from the brake cylinder.

During the greater part of the graduated release action, the piston 8 remains in its lower position under the action of the brake cylinder pressure obtaining in the space 13 but as soon as a predetermined low degree of pressure has been attained during the release the piston 8 returns to its upper position shown under the predominating action of the spring 9.

As a result direct communication between the brake cylinder 5 and the atmosphere is effected by way of pipe 15, passage 24, cavity 25 in the slide valve 3, the passages 20 and 21 and the chamber 22 and exhaust port 23.

It will thus be seen that the final release of fluid under pressure from the brake cylinder towards the end of the graduated release of the brakes is effected by the return movement of the regulating valve 7 to its normal position.

In order to avoid the necessity of providing an additional port in the seat of the slide valve 3 leading to the passage 20 as in the construction of Figure 1, the modified arrangement shown in Figure 2 may be adopted.

In this construction, the passage 20 leading from the annular space 19 above the piston 8 of the regulating valve is arranged to communicate with the graduated release valve 6 and the triple valve exhaust port through a non-return valve 26.

During a braking application, the valve 26 is held firmly upon its seat by the fluid under pressure in the passage 20 as soon as the piston 8 has moved to its lower position, thereby cutting off communication between the graduated release valve 6 and the brake cylinder 5.

When however, towards the end of the release of the brakes, the piston 8 returns to the position shown in Figure 2, the fluid remaining in the brake cylinder 5 flows past the valve 26 to the passage 20 and thence to the atmosphere by way of the passage 21 and port 23.

The invention is evidently not limited to the particular construction above described and illustrated by way of example, but may be embodied in any suitable type of regulating valve.

Having now described my invention, what I claim as new and desire to secure by Letters Patent, is:

1. In a fluid pressure brake, the combination with a brake pipe, an auxiliary reservoir, a brake cylinder, a brake controlling valve device operated by variations in brake pipe pressure for controlling the supply of fluid to and its release from the brake cylinder, and a valve device for graduating the release of fluid from the brake cylinder in releasing the brakes, of valve means subject to and operated by the pressure of the fluid in the brake cylinder and controlling a passage through which fluid is supplied to the brake cylinder and a passage through which fluid is released from the brake cylinder independent of the valve device for graduating the release of fluid from the brake cylinder, said valve means being operable on an increase in the pressure of fluid in the brake cylinder to a predetermined degree to close the passage controlled thereby through which fluid is supplied to the brake cylinder, and being operable to cut off communication through the passage through which fluid is released from the brake cylinder independently of the valve device for graduating the release of the brakes until the pressure of the fluid in the brake cylinder is reduced to a predetermined degree.

2. In a fluid pressure brake, the combination with a brake pipe, an auxiliary reservoir, a brake cylinder, a brake controlling valve device operated by variations in the brake pipe pressure for controlling the supply of fluid to and its release from the brake cylinder, and a valve device for graduating the release of fluid from the brake cylinder in releasing the brakes, of valve means subject to and operated by the pressure of the fluid in the brake cylinder and controlling a passage through which fluid is supplied to the brake cylinder, said valve means being operable on an increase in the pressure of the fluid in the brake cylinder to a predetermined degree to close the passage controlled thereby, and valve means subject to and operated by the pressure of the fluid in the brake cylinder and controlling a passage independent of the valve device for graduating the release of fluid from the brake cylinder and through which fluid may be released from the brake cylinder, said valve means being operable to cut off communication through said passage until the pressure of the fluid in the brake cylinder is reduced to a predetermined degree, and thereafter to permit communication through said passage.

ALFRED CHEVILLOT.